REELS OR THE LIKE

Filed March 12, 1963

INVENTOR.
FREDERIC A. SEFF
BY
Kleinberg & Lilling
ATTORNEYS

United States Patent Office 3,161,290

Patented Dec. 15, 1964

3,161,290
REELS OR THE LIKE

Frederic A. Seff, 226—33 Manor Road, Queens Village, N.Y.

Filed Mar. 12, 1963, Ser. No. 264,572
7 Claims. (Cl. 206—53)

This is a continuation-in-part of my prior application Serial No. 165,398 filed January 10, 1962, now United States Patent No. 3,089,585.

This invention is generally in the field of reels for tapes, films, or the like; and more specifically it presents a method and means for locking a tape or film onto a reel.

Film or tape reels of varied types are well known. For example, such reels are commonly utilized in conjunction with movie picture machines, tape recorders, etc.

It is desirable that the tape or film not unwind unless and until desired. This presents a problem in that films, being semi-rigid, will have a tendency to unwind of their own accord. This problem is not only annoying to the operator but is often destructive to the film. Should a particle of dirt be entrapped between turns of the film, it may scratch and remove a portion of the emulsion therefrom, as the turns of film move relative to each other while unwinding.

Relatively complicated apparatus have been designed to retain the external end of tape or film on a reel when not in use. Such apparatus are generally very complicated and will have portions protruding from the sides of the reel. For these reasons, none of the proposed methods of retaining film or tape on a reel have been commercially accepted.

It is a cardinal object of this invention, therefore, to provide a method and apparatus for retaining film or tape on a reel.

Another object of this invention is to provide a spring holder or retainer which may be utilized to retain wound material or any portion thereof on a reel.

Still another object and accomplishment hereof is to set forth a device as above-described that may be relatively easily mass-produced in an economical fashion.

A further purpose of this invention is to describe an apparatus as set forth above without any protruding parts and that will securely lock the exposed end of the tape or film.

Yet another object hereof is to provide a reel lock that may not be removed from the reel and thus, misplaced.

Still another purpose hereof is to set forth a reel lock that may be easily activated or de-activated merely by a touch of the finger.

In the prior application above-mentioned, the film will be locked on a reel or the like by means of a lock member held by a relatively thin elongated spring member fastened to the internal side of the disk. This construction, although an improvement over the prior art, has for certain applications been found to be somewhat deficient. For example, the clearance between the wound film and the interior sides of the reel disks is not always sufficient to provide for the above-mentioned elongated spring member. This invention overcomes this objection by providing elongated spring members in a position other than interior of the disks of the reel.

With these objects in view, the invention consists of the novel features of construction and arrangement of parts which will appear in the following specification and recited in the appended claims, reference being had to the accompanying drawings in which the same reference numerals indicate the same parts throughout the various figures and in which:

Figure 1:
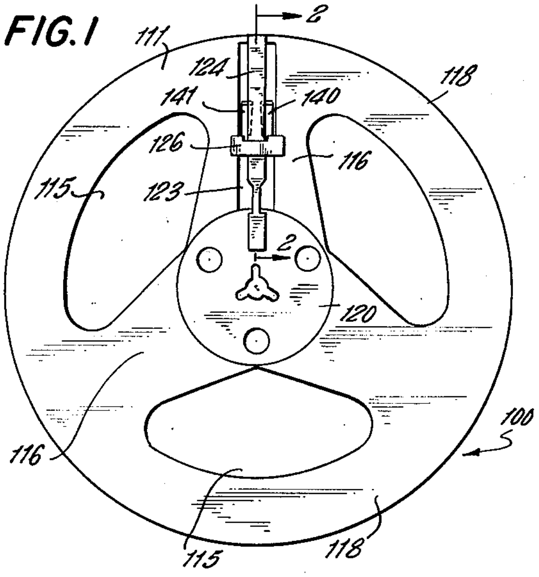
FIG. 1 is an elevational view of one embodiment of the instant invention.

Referring to FIGS. 1 to 4, which illustrate one embodiment of the invention, there is illustrated a reel structure 100. The said reel structure will have spaced and parallel disks 111 and 112. As is conventional, the disks 111 and 112 will be disposed a distance apart slightly greater than the width of the film or tape 114 to be wound thereon. The disks may further have suitable openings 115 thereon thereby forming spokes 116 to conserve material and to reduce the weight of the finished product. At their external ends, the spokes 116 terminate in a rim 118 defining the outer boundary of the reel. The reel structure 100 will further include an inner hub portion 120 to accommodate the film to be wound thereabout.

The portion of the device above-described is conventional and will not be further described. Sufficient to say, however that any of the well known film or tape reel structures may be utilized in conjunction with the invention which will be described hereinafter.

An elongated spring member 124 will be suitably fastened over a cutout 123 extending along the length of one of the spokes 116. The cutout 123 will be laterally wider than the elongated spring member 124. The said elongated spring member 124 will be fastened as by welding or the like, at its extreme ends to the portion of the rim 118 and the hub portion 120 to either side of the cutout 123. The said spring member 124 will be fabricated of any suitable resilient material. It is important, however, as illustrated in FIG. 2, that the spring member 124 be disposed on the exterior of the spaced disk 111.

Figure 4:
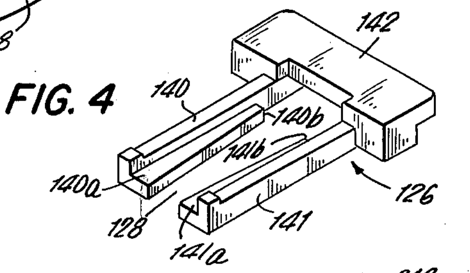
FIG. 4 is an enlarged perspective view of the film lock removed from the remainder of the device.

A spring lock 126 as illustrated in FIG. 4, will be adapted to be slipped about the said spring member 124. The said spring lock 126 will be generally U-shaped and will have two arms 140 and 141 disposed in a spaced parallel relationship from a flat flange connecting portion 142 thus forming a spaced aperture 128 between the arms 140 and 141. The length of each of the arms 140 and 141 will be slightly larger than the distance between spaced disks 111 and 112. Each of the arms 140 and 141 will have an inwardly protruding flange 140a and 141a. The connecting flange 126 will join the arms 140 and 141 in a plane spaced from the plane of the depending flanges 140a and 141a, and the depending flanges will terminate at points 140b and 141b spaced from the connecting flange 126.

Figure 2:
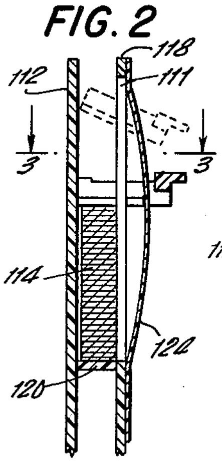
FIG. 2 is a fractional sectional view thereof on an enlarged scale taken substantially along line 2—2 of FIG. 1.
Figure 3:
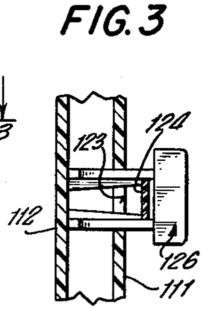
FIG. 3 is a fractional elevational view on a further enlarged scale taken substantially along line 3—3 of FIG. 2.

As illustrated in FIGS. 1, 2 and 3, the lock 126 will be inserted within the cutout 123 about the elongated spring member 124. In FIG. 1, the lock 126 is illustrated as parallel to the spaced disk 111. When in that position, the elongated spring member 124 will lie flat and between the inwardly depending flanges 140a and 141*a*, the arms 140 and 141, and the connecting flange 126. It will thus be locked onto the elongated spring member 124 and will not be capable of removal. When the film is wound on the hub portion 120 and it is desired to lock the film in that position, the lock 126 may be urged perpendicular to the disk 111 as illustrated in FIGS. 2 and 3. This will cause the elongated spring member 124 to be urged tightly against the inward terminating end 140*b* and 141*b* of the inwardly depending flanges 140*a* and 141*a* of the arms 140 and 141, thereby preventing any movement thereof. The inward pressure of the spring member 124 will retain the lock 126 in the said perpendicular position so long as desired.

The operation of this invention is then as follows:

One end of the film or tape 114 will be held against the hub portion 120 of the reel structure 100 as by insertion into a slot or otherwise as is convention. The film or tape 114 or any portion thereof will then be wound or rewound onto the reel structure 100 between the spaced disks 111 and 112. The film or tape 114 or any portion thereof may be retained on the reel structure 110 by means of the lock 126.

The lock 126 will be urged as by a finger of the operator to a position perpendicular to the disks 111 and 112 as illustrated in solid in FIG. 2. As mentioned heretofore, this causes the elongated spring member 124 to arc away from its spoke 116. The force exerted by the elongated spring member 124 will then cause the lock member 126 to retain its position perpendicular to the disks 111 and 112 by urging against the inward depending flanges 140*a* and 141*a* as mentioned heretofore. The lock member 126 may then be urged radially inward by a finger of the operator until it bears with any suitable pressure against the outermost turn of the wound film or tape 114. This will effectively lock the said film or tape 114 in position.

It is to be noted that this locking mechanism may be utilized not only to fasten the external portion of the film or tape 114 in place, but may also be used to lock any intermediate portion of the film or tape as when a film is stopped after it is only partially utilized.

Of further importance is the fact that the locking arrangement herein disclosed may be utilized to bear against the film or tape with any predetermined pressure. Thus, the film or tape may be locked with any desired intensity.

Of course, the connecting portion 142 of the spring lock 126 may be offset or have finger grips suitably positioned to present a minimum protuberance above the disk 111 when it is in either the locked or unlocked position.

Figure 5:
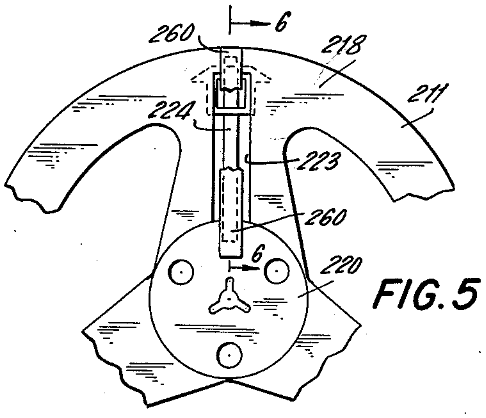
FIG. 5 is a fractional elevational view corresponding to FIG. 1 but showing a second embodiment of the invention set forth herein.
Figure 6:
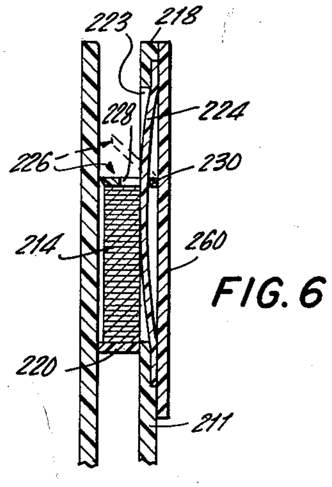
FIG. 6 is an enlarged fractional sectional view taken substantially along line 6—6 of FIG. 5.
Figure 7:
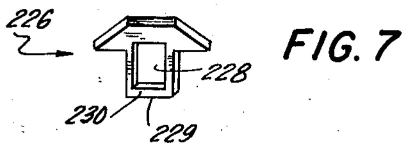
FIG. 7 is a view in perspective of a locking member to be utilized in conjunction with the second embodiment of the invention.

Shown in FIGS. 5, 6 and 7 is a second alternate embodiment of this invention. In this said second embodiment, it will be seen, especially in FIG. 6, that an elongated spring member 224 will be fastened as by welding or the like, along the central portion of the cutout 223 in the same plane as the balance of the disk 211. Fastened adjacent the elongated spring member 224 and overlying the same, will be a relatively rigid backing member 260. The said backing member 260 may have approximately the same width as the elongated spring member 224 but may be somewhat longer to be fastened to the rim 218 and the hub 220. The backing member 260 will be fastened to the outward side of the said disk 211.

As illustrated in FIG. 7, a spring lock 226 consisting primarily of a flat piece of rigid material will be suitably slipped about the said spring member 224 as shown in FIG. 5 and 6. The lock 226 will have an aperture 228 adjacent its external ends 229. There will only then be a thin strip of material 230 between the aperture 228 and the end 229.

It will be noted that because of the shape of the lock 226 and the aperture 228 therein, the said lock can lie almost flat partially between the elongated spring member 224 and the rigid backing member 260 (as shown in FIG. 5, wherein a central portion of the backing member is shown broken away for ease of explanation).

Alternately, however, the said lock 226 may be urged perpendicularly to the disk 211 as illustrated in FIG. 6. This will cause the elongated spring member 224 to be urged tightly against the aperture end of the thin strip of material 230 preventing any spontaneous movement thereof. This will serve to retain the spring lock 226 in the said perpendicular position, when desired.

The operation of this second embodiment of this invention is substantially as set forth heretofore. When it is desired to lock the film or tape 214 in position, the spring lock 226 will be urged perpendicular to the disk 211 and pressed against the outer turn of the said film or tape.

It will be seen, therefore, that there is set forth herein a device which will accomplish all of the objects previously set forth.

While there are above disclosed but a limited number of embodiments of the structure and product of the invention herein presented, it is possible to produce still other embodiments without departing from the inventive concept herein disclosed, and it is desired, therefore, that only such limitations be imposed on the appended claims as are stated therein or required by the prior art.

Having thus described my invention and illustrated its use, what I claim as new and desire to secure by Letters Patent is:

1. A self-locking reel comprising:
   (*a*) an annular hub about which film is adapted to be wound,
   (*b*) two parallel disks arranged about said hub to locate said film to be wound therebetween,
   (*c*) an elongated spring member fastened across a cutout in one of said disks, said elongated spring member being fastened only at its external ends to the side of said disk away from said other disk,
   (*d*) a thin lock member having an aperture adjacent one end thereof,
   (*e*) the said spring member passing through said aperture and urging at least a portion of said lock member against said other disk whereby said lock member may be retained alternately in a first position almost parallel to said one disk and a second position perpendicular to said one disk.

2. A self-locking reel as set forth in claim 1 wherein said cutout is substantially wider than said spring member.

3. A self-locking reel comprising:
   (*a*) an annular hub about which film is adapted to be wound,
   (*b*) two parallel disks arranged about said hub to locate said film to be wound therebetween,
   (*c*) an elongated spring member fastened across a cutout in one of said disks, said elongated spring member being fastened only at its external ends in the same plane as said disk,
   (*d*) a thin lock member having an aperture adjacent one end thereof,
   (*e*) the said spring member passing through said aperture and urging at least a portion of said lock member against said other disk whereby said lock member may be retained alternately in a first position almost parallel to said one disk and a second position perpendicular to said one disk.

4. A self-locking reel as set forth in claim 3, further including, a rigid backing member fastened across said cutout along the side of the said disk away from said other disk, whereby said portion of said lock member will be between said elongated spring member and said rigid backing member.

5. A self-locking reel as set forth in claim 4 wherein said cutout is substantially wider than said spring member.

6. A self-locking reel comprising:

(*a*) an annular hub about which film is adapted to be wound, (*b*) two parallel disks arranged about said hub to locate said film to be wound therebetween, (*c*) an elongated spring member fastened across a radial cutout in one of said disks, said elongated spring member being fastened only at its external ends in the same plane and radial to said disk, (*d*) a thin lock member having an aperture adjacent one end thereof, (*e*) the said spring member passing through said aperture and urging at least a portion of said lock member against said other disk whereby said lock member may be retained alternately in a first position almost parallel to said one disk and a second position perpendicular to said one disk.

7. A self-locking reel as set forth in claim 6, wherein said thin lock member may be moved radial of said reel along said spring member while said lock member is in said first position.

References Cited by the Examiner

UNITED STATES PATENTS

| | | | |
|---|---|---|---|
| 528,130 | 10/94 | Pugh et al. | 24—252 X |
| 706,522 | 8/02 | Bryant | 24—252 |
| 1,216,967 | 2/17 | Dunavant | 242—74.2 |
| 2,252,685 | 8/41 | Babcock | 24—252 |
| 2,301,392 | 11/42 | Funke | 206—53 |
| 2,915,256 | 12/59 | Bruhn | 242—74.2 |
| 3,089,585 | 5/63 | Seff | 206—53 |

THERON E. CONDON, *Primary Examiner.*

EARLE A. DRUMMOND, *Examiner.*